United States Patent
Taira et al.

(10) Patent No.: US 12,397,621 B2
(45) Date of Patent: Aug. 26, 2025

(54) RELAY DEHUMIDIFIER FOR VEHICLE

(71) Applicant: SUBARU CORPORATION, Tokyo (JP)

(72) Inventors: Masakazu Taira, Tokyo (JP); Tomoya Sato, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 194 days.

(21) Appl. No.: 18/243,316

(22) Filed: Sep. 7, 2023

(65) Prior Publication Data

US 2024/0100913 A1  Mar. 28, 2024

(30) Foreign Application Priority Data

Sep. 27, 2022 (JP) ................................. 2022-153457

(51) Int. Cl.
*H01H 50/12* (2006.01)
*B60H 1/00* (2006.01)
*B60H 3/02* (2006.01)

(52) U.S. Cl.
CPC ......... *B60H 3/024* (2013.01); *B60H 1/00785* (2013.01); *H01H 50/12* (2013.01)

(58) Field of Classification Search
CPC .... B60H 1/00785; B60H 3/024; H01H 45/00; H01H 45/12; H01H 50/02; H01H 50/12
See application file for complete search history.

(56) References Cited

U.S. PATENT DOCUMENTS

2014/0247099 A1* 9/2014 Carrete ................. H01H 50/12
                                                     335/156

FOREIGN PATENT DOCUMENTS

JP           2021-30738 A      3/2021

* cited by examiner

*Primary Examiner* — Jonathan Bradford
(74) *Attorney, Agent, or Firm* — MCGINN I.P. LAW GROUP, PLLC

(57) ABSTRACT

A relay dehumidifier for a vehicle includes a relay housing, a valve, and a valve processor. The relay housing houses a mechanical relay body, and communicates individually with each of a negative pressure source and an evaporator. The valve is disposed at a first communication pipe. The first communication pipe communicates the negative pressure source and the relay housing with each other. The valve processor is configured to control an opening and closing operation of the valve. The valve processor is configured to close the valve in a normal state, and open the valve when: the negative pressure source generates a negative pressure; and a humidity of an outlet of the evaporator is equal to or less than a predetermined value.

4 Claims, 2 Drawing Sheets

RELAY DEHUMIDIFIER FOR VEHICLE

CROSS-REFERENCE TO RELATED APPLICATIONS

The present application claims priority from Japanese Patent Application No. 2022-153457 filed on Sep. 27, 2022, the entire contents of which are hereby incorporated by reference.

BACKGROUND

The disclosure relates to a relay dehumidifier for a vehicle.

A mechanical relay mounted on a vehicle can involve, for example, a gradual evaporation of a moisture included in a coil and an increase a humidity in a relay housing accordingly. The increase in the humidity in the relay housing can cause a condensation of contacts and freezing of the contacts in a low-temperature environment. When the contacts are frozen, the contact are inhibited from coming into contact with each other, which can cause a bad electrical conduction.

Japanese Unexamined Patent Application Publication (JP-A) No. 2021-30738 discloses a technique in which a moisture contained in a coil is evaporated by increasing an exciting current of the coil to increase an internal pressure of a relay housing. Thus, high humidity air in the relay housing is discharged from a through hole to the outside.

SUMMARY

An aspect of the disclosure provides a relay dehumidifier for a vehicle. The relay dehumidifier includes a relay housing, a valve, and a valve processor. The relay housing houses a mechanical relay body, and communicates individually with each of a negative pressure source and an evaporator. The valve is disposed at a first communication pipe. The first communication pipe communicates the negative pressure source and the relay housing with each other. The valve processor is configured to control an opening and closing operation of the valve. The valve processor is configured to close the valve in a normal state, and open the valve when: the negative pressure source generates a negative pressure; and a humidity of an outlet of the evaporator is equal to or less than a predetermined value.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
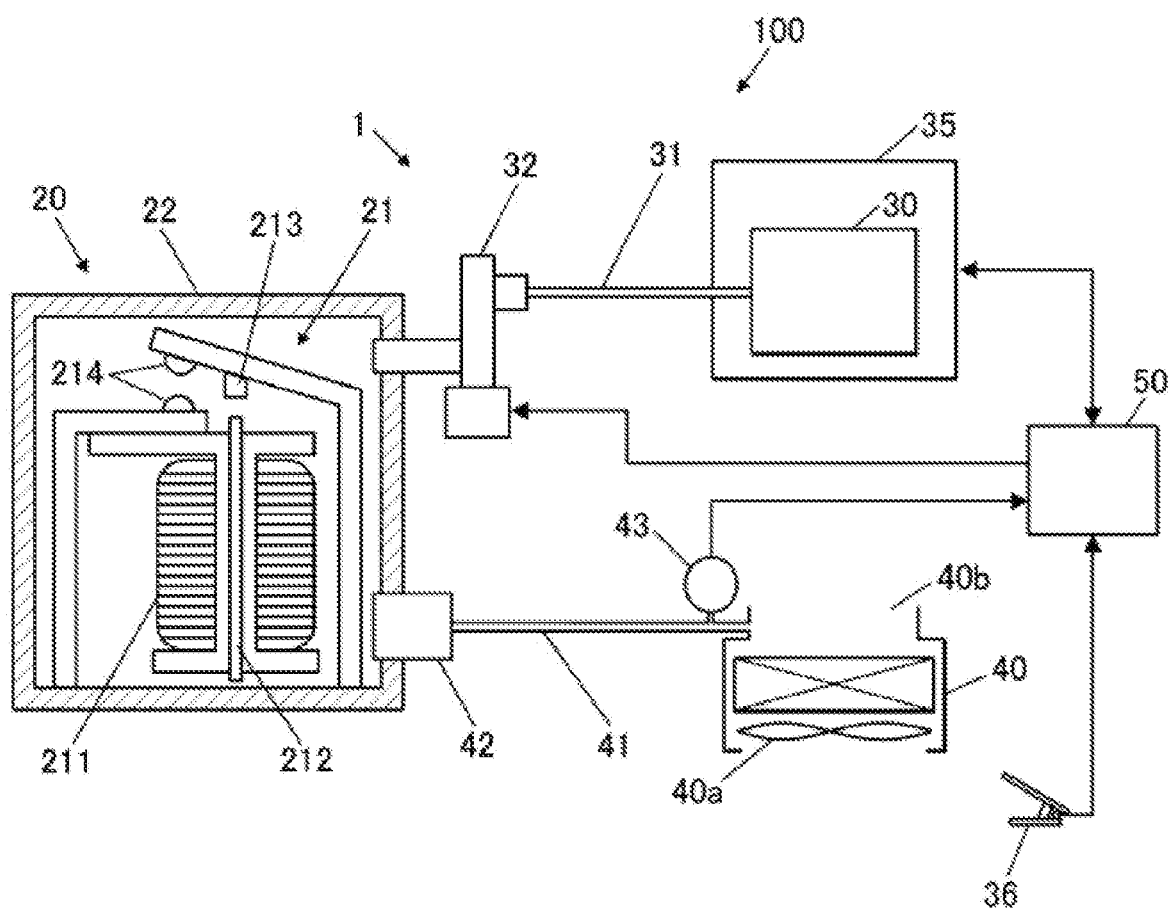
FIG. 1 is a block diagram illustrating a schematic configuration of a vehicle including a relay dehumidifier according to one example embodiment of the disclosure.

A technique described in JP-A No. 2021-30738 functions ineffectively when a moisture included in a coil decreases. The technique described in JP-A No. 2021-30738 also has a through hole provided on a relay housing, which can rather allow wet air to enter from the through hole.

It is desirable to provide a relay dehumidifier for a vehicle which makes it possible to suitably suppress freezing of a contact of a mechanical relay.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 is a block diagram illustrating a schematic configuration of a vehicle 100 including a relay dehumidifier 1 according to an example embodiment of the disclosure.

The relay dehumidifier 1 according to the example embodiment is to be mounted on the vehicle 100 and may dehumidify the inside of a mechanical relay 20.

The mechanical relay 20 may include: a mechanical relay body 21; and a relay housing 22 that houses the mechanical relay body 21.

The mechanical relay body 21 may cause two contacts 214 to come into contact with each other when a coil 211 is energized and an iron core 212 thus magnetized attracts an armature 213. This configuration may operate, for example, an unillustrated electrical device coupled to the two contacts 214.

The relay housing 22 may include a material such as an epoxy resin or a PBT resin. The relay housing 22 may seal the mechanical relay body 21 provided in the relay housing 22 with a predetermined degree of sealing. The relay housing 22 may be in communication individually with each of a surge tank 30 and an evaporator 40. For example, the relay housing 22 and the surge tank 30 may communicate with each other via a first communication pipe 31, and the relay housing 22 and an outlet 40b of the evaporator 40 may communicate with each other via a second communication pipe 41.

The surge tank 30 may be provided in an intake manifold of the engine 35 that serves as an internal combustion engine. The surge tank 30 may be a container-shaped device that temporarily stores intake air to flow to a cylinder. In one embodiment, the surge tank may serve as a "negative pressure source".

The evaporator 40 may be a device that cools and/or dehumidifies air in a vehicle compartment of the vehicle 100. For example, the evaporator 40 may cool, by heat-exchanging with a coolant, the air in the vehicle compartment blown by a fan 40a, and allow condensed water generated upon the cooling to be discharged to the outside. Thus, dehumidified dry air may be delivered from the outlet 40b of the evaporator 40 during an operation of the evaporator 40.

The first communication pipe 31 may include a solenoid valve 32.

In one embodiment, the solenoid valve 32 may serve as a "valve". In the example embodiment, the solenoid valve 32 may be disposed at a part at which the first communication pipe 31 and the relay housing 22 communicate with each other, and open and close the communication part. An opening and closing operation of the solenoid valve 32 may be controlled by an electronic control unit (ECU) 50 that performs an electronic control of the engine 35. In one embodiment, the ECU 50 may serve as a "valve processor". The solenoid valve 32 may be closed in a normal state in which the solenoid valve 32 is not opened by the ECU 50. The relay dehumidifier 1 may include at least the relay housing 22, the solenoid valve 32, and the ECU 50.

The second communication pipe 41 may include a check valve 42 and a humidity sensor 43.

The check valve 42 may keep a flow in the second communication pipe 41 in one direction from the outlet 40b of the evaporator 40 into the relay housing 22, and suppress a backflow thereof. In the example embodiment, the check valve 42 may be disposed at a part at which the second communication pipe 41 and the relay housing 22 communicate with each other. The check valve 42 may keep a pressure difference between the inside and the outside of the relay housing 22 constant in a normal state. That is, a pressure in the relay housing 22 in the normal state may be maintained substantially constant through the check valve 42. It should be noted that a position of the check valve 42 is not particularly limited, as long as the check valve 42 is disposed at any location at which the outlet 40b of the evaporator 40 and the inside of the relay housing 22 communicate with each other.

The humidity sensor 43 may measure a humidity of the outlet 40b of the evaporator 40, and output the measured humidity to the ECU 50. A position at which the humidity sensor 43 is disposed is not particularly limited, as long as the humidity sensor 43 is able to measure the humidity of the outlet 40b of the evaporator 40. In some embodiments, the humidity sensor 43 may be disposed at the second communication pipe 41 or may be disposed at the evaporator 40.

Next, a description is given of an example of an operation of the relay dehumidifier 1.

Figure 2:
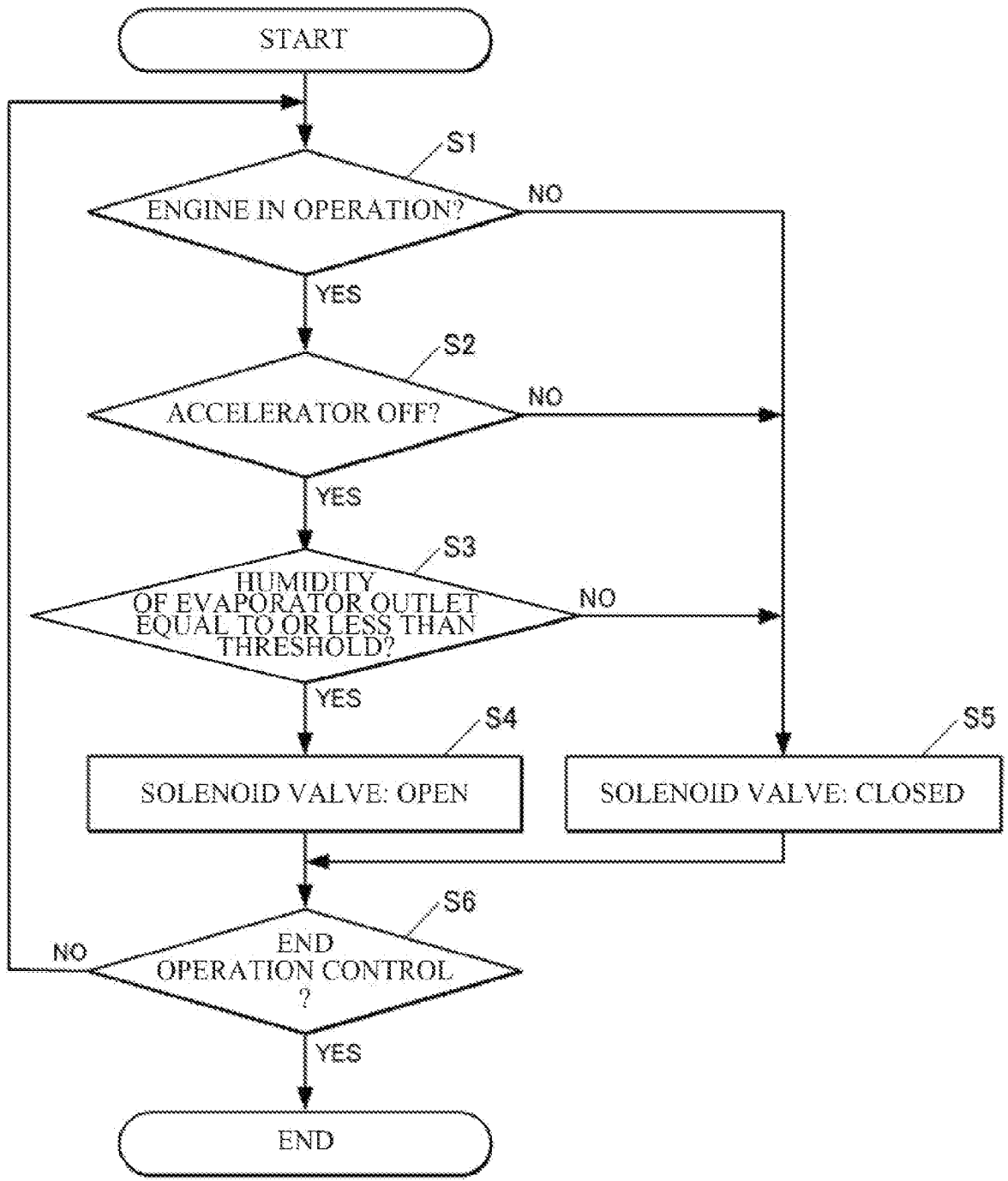
FIG. 2 is a flowchart illustrating an example of a flow of an operation to be performed by the relay dehumidifier illustrated in FIG. 1.

FIG. 2 is a flowchart illustrating an example of a flow of the operation to be performed by the relay dehumidifier 1.

It should be noted that, in the example embodiment, the solenoid valve 32 is closed and the inside of the first communication pipe 31 is closed in the normal state as described above.

Referring to FIG. 2, the ECU 50 may determine whether the engine 35 is in operation (step S1). If the ECU 50 determines that the engine 35 is not in operation (step S1: No), the ECU 50 may cause a process to proceed to later-described step S5.

If the ECU 50 determines in step S1 that the engine 35 is in operation (step S1: Yes), the ECU 50 may determine whether an accelerator operating device 36 of the vehicle 100 is not operated (step S2). For example, the ECU 50 may determine whether an accelerator position is at a closed position (step S2). In one embodiment, the accelerator operating device 36 may serve as an "accelerator".

If the ECU 50 determines in step S2 that the accelerator operating device 36 is operated (an accelerator: ON) (step S2: No), the ECU 50 may cause the process to proceed to later-described step S5.

If the ECU 50 determines in step S2 that the accelerator operating device 36 is not operated (the accelerator: OFF) (step S2: Yes), the ECU 50 may determine whether the humidity of the outlet 40b of the evaporator 40 is equal to or less than a predetermined threshold, based on an output value of the humidity sensor 43 (step S3).

In some embodiments, the humidity that satisfies the "predetermined threshold" may encompass, for example, a humidity condition in which a moisture condensation does not occur or hardly occurs even when the inside of the relay housing 22 is cooled to a predetermined low temperature, where the inside of the relay housing 22 is under a humidity atmosphere that satisfies the threshold.

If the ECU 50 determines in the step S3 that the humidity of the outlet 40b of the evaporator 40 is equal to or less than the predetermined threshold (step S3: Yes), the ECU 50 may open the solenoid valve 32 (step S4).

For example, when all of conditions from step S1 to step S3 are satisfied, that is: when the engine 35 is in operation; the accelerator operating device 36 is operated; and the outlet 40b of the evaporator 40 is equal to or less than the predetermined threshold, the ECU 50 may open the solenoid valve 32.

Accordingly, the surge tank 30 may communicate with the outlet 40b of the evaporator 40 through the inside of the relay housing 22. Upon the communication of the surge tank 30, the engine 35 may be in operation and the accelerator operation device 36 may not be operated, causing the inside of the surge tank 30 to have a negative pressure that is lower than an atmospheric pressure. Thus, the inside of the relay housing 22 may be scavenged by dry air derived from the outlet 40b of the evaporator 40, allowing the inside of the relay housing 22 to be filled with the dry air. The scavenged air may be combusted by the engine 35 through the surge tank 30.

If the ECU 50 determines in step S3 that the humidity of the outlet 40b of the evaporator 40 is not equal to or less than the predetermined threshold (step S3: No), the ECU 50 may close the solenoid valve 32 (step S5). For example, when any one of the conditions from step S1 to step S3 is not satisfied, the ECU 50 may close the solenoid valve 32. When the solenoid valve 32 is already closed, the ECU 50 may maintain the closed state of the solenoid valve 32.

It should be noted that the order of determinations from step S1 to step S3 is not particularly limited. In some embodiments, the order of determinations from step S1 to step S3 may be in any order.

In step S6, the ECU 50 may determine whether to end a control of the operation of the relay dehumidifier 1 (step S6). If the ECU 50 determines not to end the control of the operation (step S6: No), the ECU 50 may cause the process to proceed to step S1 described above.

If the ECU 50 determines that the control of the operation of the relay dehumidifier 1 is to be ended (step S6: Yes), the ECU 50 may end the control of the operation of the relay dehumidifier 1. For example, the ECU 50 may end the control of the operation of the relay dehumidifier 1 if the ECU 50 determines that the control of the operation of the relay dehumidifier 1 is to be ended by stopping of the operation of the engine 35.

According to the foregoing example embodiment, the relay housing 22 communicates individually with each of the surge tank 30 and the evaporator 40, and the solenoid valve 32 is disposed at the first communication pipe 31 that communicates the surge tank 30 and the relay housing 22 with each other. The solenoid valve 32 is closed in the normal state. The solenoid valve 32 is opened when: the surge tank 30 generates the negative pressure; and the humidity of the outlet 40b of the evaporator 40 is equal to or less than the predetermined threshold.

Thus, opening the solenoid valve 32 sucks the air in the relay housing 22 owing to the negative pressure in the surge tank 30, and the inside of the relay housing 22 is scavenged by the dry air derived from the outlet 40b of the evaporator 40. This configuration helps to fill the inside of the relay housing 22 with the dry air and thereby to suppress an occurrence of the moisture condensation in the relay housing 22. Accordingly, this configuration helps to suitably suppress freezing of the contact 214 of the mechanical relay 20.

Further, according to the example embodiment, the inside of the relay housing 22 is periodically scavenged with the dry air in association with the operation of the engine 35 and the operation of the evaporator 40. Accordingly, this configuration helps to suitably suppress the increase in the humidity in the relay housing 22, especially in a case of long-term use where there is a concern of the increase in the humidity in the relay housing 22 due to a factor such as moisture permeability.

In some embodiments, a determination may be made that the surge tank 30 generates the negative pressure, when the engine 35 is in operation and the accelerator operation device 36 is not operated.

This configuration helps to suitably use the surge tank 30 as the negative pressure source.

In some embodiments, the check valve 42 may be disposed at the second communication pipe 41 that communicates the evaporator 40 and the relay housing 22 with each other, and the check valve 42 keeps the flow in the second communication pipe 41 in one direction from the outlet 40b of the evaporator 40 into the relay housing 22.

This configuration helps to suppress the backflow of the air from the relay housing 22 to the outlet 40b of the evaporator 40.

Although some example embodiments of the disclosure have been described in the foregoing by way of example with reference to the accompanying drawings, the disclosure is by no means limited to the embodiments described above.

For example, in the example embodiment, the surge tank may serve as an example of the negative pressure source according to one embodiment. However, the negative pressure source according to any embodiment of the disclosure is not limited to the surge tank as long as the negative pressure is generated. In some embodiments, the negative pressure source may be a cooling fan for a radiator. In such embodiments, the condition for the cooling fan to generate the negative pressure, i.e., the conditions corresponding to steps S1 and S2, may be whether the cooling fan is in operation.

In the example embodiment, the ECU 50 that performs the electronic control of the engine 35 may serve as an example of the valve processor according to one embodiment. In some embodiments, the valve processor may be any processor that is separate from the ECU 50.

In the example embodiment, the single mechanical relay 20 may be provided, although the number of the mechanical relays 20 is not particularly limited. In some embodiments, the multiple mechanical relays 20 may be provided. In such embodiments where the multiple mechanical relays 20 are provided, the mechanical relays 20 may be communicated individually with each of the surge tank (e.g., the negative pressure source) and the evaporator, and may be individually controlled to operate.

It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The ECU 50 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECU 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ECU 50 illustrated in FIG. 1.

The invention claimed is:

1. A relay dehumidifier for a vehicle, the relay dehumidifier comprising:
   a relay housing that houses a mechanical relay body, and communicates individually with each of a negative pressure source and an evaporator;
   a valve disposed at a first communication pipe, the first communication pipe communicating the negative pressure source and the relay housing with each other; and
   a valve processor configured to control an opening and closing operation of the valve, and configured to close the valve in a normal state, and open the valve when: the negative pressure source generates a negative pressure; and a humidity of an outlet of the evaporator is equal to or less than a predetermined value.

2. The relay dehumidifier for the vehicle according to claim 1, wherein the negative pressure source comprises a surge tank.

3. The relay dehumidifier for the vehicle according to claim 2, wherein the valve processor is configured to determine that the negative pressure source generates the negative pressure when: an engine of the vehicle is in operation and an accelerator of the vehicle is not operated.

4. The relay dehumidifier for the vehicle according to claim 1, further comprising a check valve disposed at a second communication pipe that communicates the evaporator and the relay housing with each other, and configured to keep a flow in the second communication pipe in one direction from the outlet of the evaporator into the relay housing.

* * * * *